(12) United States Patent
Yan

(10) Patent No.: US 7,614,214 B2
(45) Date of Patent: *Nov. 10, 2009

(54) GASIFICATION OF SOOT TRAPPED IN A PARTICULATE FILTER UNDER REDUCING CONDITIONS

(75) Inventor: Jiyang Yan, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 414 days.

This patent is subject to a terminal disclaimer.

(21) Appl. No.: 11/493,120

(22) Filed: Jul. 26, 2006

(65) Prior Publication Data

US 2008/0022662 A1    Jan. 31, 2008

(51) Int. Cl.
*F01N 3/00* (2006.01)
(52) U.S. Cl. .............................. 60/286; 60/274; 60/285; 60/295; 60/297; 60/301; 48/197 R
(58) Field of Classification Search ................... 60/274, 60/286, 295, 297, 301, 311; 48/197 R
See application file for complete search history.

(56) References Cited

U.S. PATENT DOCUMENTS

| 5,330,945 | A | 7/1994 | Beckmeyer et al. |
| 5,707,593 | A | 1/1998 | Wang |
| 6,732,507 | B1 | 5/2004 | Stanglmaier et al. |
| 6,735,941 | B2 | 5/2004 | Saito et al. |
| 6,758,036 | B1 | 7/2004 | Molinier |
| 6,832,473 | B2 * | 12/2004 | Kupe et al. ................... 60/286 |
| 7,040,084 | B2 * | 5/2006 | Ament ......................... 60/274 |
| 7,093,428 | B2 * | 8/2006 | LaBarge et al. ............... 60/286 |
| 7,434,387 | B2 * | 10/2008 | Yan ............................. 60/286 |
| 7,435,275 | B2 * | 10/2008 | Simpkins et al. ........... 48/197 R |
| 2001/0052232 | A1 | 12/2001 | Hoffmann et al. |
| 2003/0113249 | A1 | 6/2003 | Hepburn et al. |
| 2003/0140622 | A1 | 7/2003 | Taylor, III et al. |
| 2004/0050037 | A1 | 3/2004 | Betta et al. |
| 2004/0076565 | A1 | 4/2004 | Gandhi et al. |
| 2004/0116276 | A1 | 6/2004 | Yezerets et al. |

FOREIGN PATENT DOCUMENTS

| WO | WO 98/29180 A1 | 7/1998 |
| WO | WO 03/011437 A1 | 2/2003 |
| WO | WO 03/056150 A2 | 7/2003 |
| WO | WO 2004/061278 A1 | 7/2004 |
| WO | WO 2004/090296 A1 | 10/2004 |

* cited by examiner

*Primary Examiner*—Binh Q Tran
(74) *Attorney, Agent, or Firm*—Paul V. Keller

(57) ABSTRACT

A power generation system comprises a diesel engine, a diesel particulate filter and a LNT configured to receive the exhaust from the DPF. The DPF is provided with a catalyst coating that is functional to catalyze methanation of trapped soot with $H_2$ contained in the exhaust. Preferably, the catalyst has little or no oxygen storage capacity. The system is configured to regenerate the LNT by providing syn gas to the exhaust in rich regeneration phases. The syn gas-containing exhaust passes through the DPF and then the LNT. Within the DPF, the syn gas-containing exhaust removes soot be methanation and other soot gasification reactions, thus reducing or eliminating the need to reduce the DPF by other means. Soot gasification is preferred over soot combustion in that soot gasification avoids the destructive high DPF temperatures associated with soot combustion.

9 Claims, 2 Drawing Sheets

US 7,614,214 B2

GASIFICATION OF SOOT TRAPPED IN A PARTICULATE FILTER UNDER REDUCING CONDITIONS

FIELD OF THE INVENTION

The present invention relates to pollution control devices for diesel engines.

BACKGROUND $NO_x$ and particulate matter (soot) emissions from diesel engines are an environmental problem. Several countries, including the United States, have long had regulations pending that will limit $NO_x$ and particulate matter emissions from trucks and other diesel-powered vehicles. Manufacturers and researchers have put considerable effort toward meeting those regulations. Diesel particulate filters (DPFs) have been proposed for controlling particulate matter emissions. A number of different solutions have been proposed for controlling NOx emissions.

In gasoline powered vehicles that use stoichiometric fuel-air mixtures, $NO_x$ emissions can be controlled using three-way catalysts. In diesel-powered vehicles, which use compression ignition, the exhaust is generally too oxygen-rich for three-way catalysts to be effective.

One set of approaches for controlling NOx emissions from diesel-powered vehicles involves limiting the creation of pollutants. Techniques such as exhaust gas recirculation and partially homogenizing fuel-air mixtures are helpful in reducing NOx emissions, but these techniques alone are not sufficient. Another set of approaches involves removing NOx from the vehicle exhaust. These approaches include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich exhaust conditions. A LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to remove accumulated NOx and thereby regenerate (denitrate) the LNT.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine fuel injectors or separate injection devices. For example, the engine can inject extra fuel into the exhaust within one or more cylinders prior to expelling the exhaust. Alternatively, or in addition, reductant can be injected into the exhaust downstream of the engine.

U.S. Pat. Pub. No. 2004/0050037 (hereinafter "the '037 publication") describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate.

The operation of an inline reformer can be modeled in terms of the following three reactions:

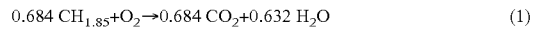

$$0.684\ CH_{1.85} + O_2 \rightarrow 0.684\ CO_2 + 0.632\ H_2O \quad (1)$$

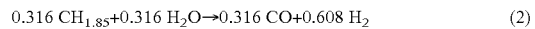

$$0.316\ CH_{1.85} + 0.316\ H_2O \rightarrow 0.316\ CO + 0.608\ H_2 \quad (2)$$

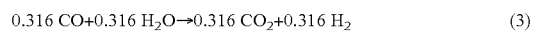

$$0.316\ CO + 0.316\ H_2O \rightarrow 0.316\ CO_2 + 0.316\ H_2 \quad (3)$$

wherein $CH_{1.85}$ represents an exemplary reductant, such as diesel fuel, with a 1.85 ratio between carbon and hydrogen. Reaction (1) is exothermic complete combustion by which oxygen is consumed. Reaction (2) is endothermic steam reforming. Reaction (3) is the water gas shift reaction, which is comparatively thermal neutral.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced. Reformate is an effective reductant for LNT denitration.

During denitrations, much of the adsorbed NOx is reduced to $N_2$, although a portion of the adsorbed NOx is released without having been reduced and another portion of the adsorbed NOx is deeply reduced to ammonia. The NOx release occurs primarily at the beginning of the regeneration. The ammonia production has generally been observed towards the end of the regeneration.

U.S. Pat. No. 6,732,507 proposes a system in which a SCR catalyst is configured downstream of the LNT in order to utilize the ammonia released during denitration. The LNT is provided with more reductant over the course of a regeneration than required to remove the accumulated NOx in order to facilitate ammonia production. The ammonia is utilized to reduce NOx slipping past the LNT and thereby improves conversion efficiency over a stand-alone LNT.

U.S. Pat. Pub. No. 2004/0076565 (hereinafter "the '565 publication") also describes hybrid systems combining LNT and SCR catalysts. In order to increase ammonia production, it is proposed to reduce the rhodium loading of the LNT. In order to reduce the NOx release at the beginning of the regeneration, it is proposed to eliminate oxygen storage capacity from the LNT.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat can be provided through the same types of reactions as used to remove excess oxygen from the exhaust. Once the LNT is sufficiently heated, the exhaust is made rich by measures like those used for LNT denitration.

Diesel particulate filters must also be regenerated. Regeneration of a DPF is to remove accumulated soot. Two general approaches are continuous and intermittent regeneration. In continuous regeneration, a catalyst is provided upstream of the DPF to convert NO to $NO_2$. $NO_2$ can oxidize soot combustion at typical diesel exhaust temperatures and thereby effectuate continuous regeneration. A disadvantage of this approach is that it requires a large amount of expensive catalyst.

Intermittent regeneration involves heating the DPF to a temperature at which soot combustion is self-sustaining in a lean environment. Typically this is a temperature from about 400 to about 650° C., depending in part on what type of catalyst coating has been applied to the DPF to lower the soot ignition temperature. A challenge in using this approach is that soot combustion tends to be non-uniform and high local temperatures can lead to degradation of the DPF.

Because both DPF regeneration and LNT desulfation require heating, it has been proposed to carry out the two operation successively. The main barrier to combining desulfation and DPF regeneration has been that desulfation requires rich condition and DPF regeneration requires lean conditions. U.S. Pat. Pub. No. 2001/0052232 suggests heating the DPF to initiate soot combustion, and afterwards desulfating the LNT, whereby the LNT does not need to be separately heated. Similarly, U.S. Pat. Pub. No. 2004/0113249 describes adding reductant to the exhaust gases to heat the DPF, ceasing the addition of reductant to allow the DPF to regenerate, and then resuming reductant addition to desulfate the LNT.

U.S. Pat. Pub. No. 2004/0116276 suggests close coupling a DPF and a LNT, with the DPF upstream of the LNT. The publication suggests that this close-coupling allows CO produced in the DPF during DPF regeneration to assist regeneration of the downstream LNT by removing NOx during DPF regeneration in a lean environment.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

One of the inventor's concepts relates to a power generation system, comprising a diesel engine, a diesel particulate filter, and a LNT configured to receive the exhaust from the DPF. The DPF is provided with a catalyst coating that is functional to catalyze methanation of trapped soot with $H_2$. Preferably, the catalyst has little or no oxygen storage capacity. The system is configured to regenerate the LNT by providing syn gas to the exhaust in rich regeneration phases. The syn gas passes through the DPF and then the LNT. Within the DPF, the syn gas-containing exhaust removes soot by methanation and other soot gasification reactions, thus reducing or eliminating the need to reduce the DPF by other means. Soot gasification is preferred over soot combustion in that soot gasification avoids destructive high temperatures.

Another of the inventor's concepts relates to a method of operating a power generation system. The method comprises operating a diesel engine to produce power and exhaust, passing the exhaust through a particulate filter to trap soot from the exhaust, passing the exhaust through a LNT, whereby the LNT adsorbs and stores NOx and SOx from the exhaust. From time-to-time a rich phase is initiated to regenerate the LNT. The regeneration can be a denitration or a desulfation. In the rich phases, a fuel reformer is used to produce reformate that is provided to the exhaust upstream of the DPF, whereby the DPF receives a rich exhaust mixture containing reformate. Within the DPF, soot gasification reactions are catalyzed by which soot is removed from the DPF by the rich exhaust gas mixture. The rich exhaust gas is then passed to the LNT, whereby the LNT is regenerated.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claim as his invention being reserved for the claims that follow.

DETAILED DESCRIPTION

Figure 1:
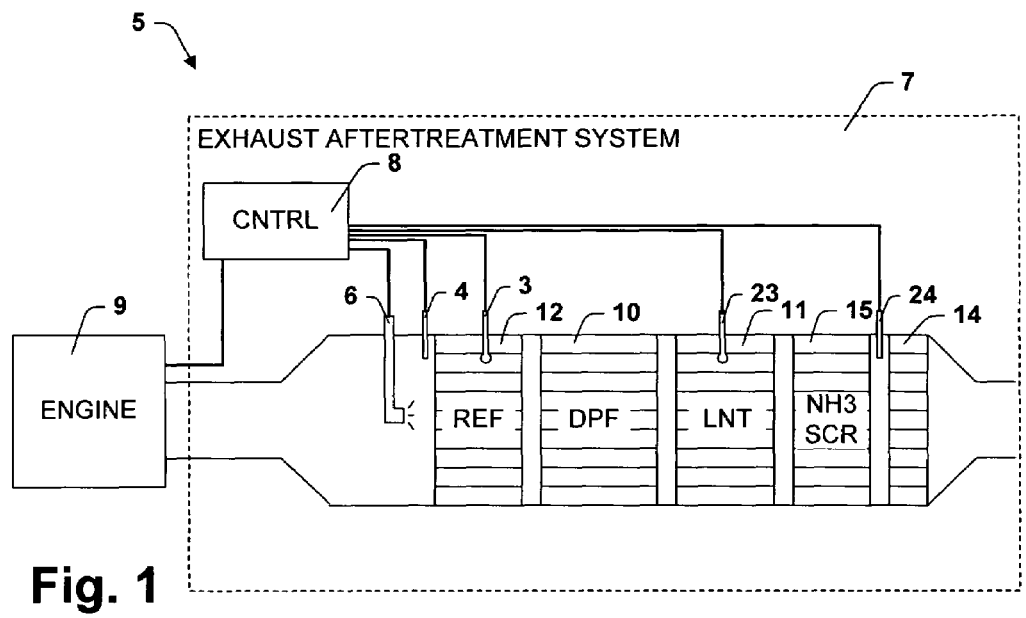
FIG. 1 is a schematic illustration of an exemplary power generation system conceived by the inventor.

FIG. 1 provides a schematic illustration of an exemplary power generation system 5 in which some of the inventor's concepts may be embodied. The system 5 includes a diesel engine 9 and an exhaust aftertreatment system 7. The exhaust aftertreatment system 7 includes a controller 8, a fuel injector 6, a diesel particulate filter (DPF) 10, a fuel reformer 12, a lean NOx-trap (LNT) 11 an ammonia-SCR catalyst 15, and a clean-up catalyst 14. The controller 8 receives data from several sources; including temperature sensors 3 and 23 and NOx sensors 4 and 24. The controller 8 may be an engine control unit (ECU) that also controls the exhaust aftertreatment system 7 or may include several control units that collectively perform these functions.

The engine 9 is typically a diesel engine operational to produce a lean exhaust. Lean exhaust generally contains from about 4 to about 20% oxygen. Lean exhaust also generally contains NOx and soot. The engine 9 can be operated to reduce the production of either NOx or soot, but reducing the output of one pollutant typically increases the output of the other. Typical untreated diesel engine exhaust contains environmentally unacceptable amounts of both NOx and soot.

The DPF 10 removes particulates from the exhaust. During lean operation (a lean phase), the LNT 11 adsorbs and stores a portion of the NOx from the exhaust. The ammonia-SCR catalyst 15 may have ammonia stored from a previous regeneration of the LNT 11 (a rich phase). If the ammonia-SCR catalyst 15 contains stored ammonia, it removes a second portion of the NOx from the lean exhaust. The clean-up catalyst 14 may serve to oxidize CO and unburned hydrocarbons remaining in the exhaust.

From time-to-time, the LNT 11 must be regenerated to remove accumulated NOx (denitrated). Denitration may involve heating the reformer 12 to an operational temperature and then injecting fuel using the fuel injector 6 at a rate that leaves the exhaust rich. The reformer 12 uses the injected fuel to consume most of the oxygen from the exhaust while producing reformate. The reformate first passes through the DPF 10, where it removes soot by catalyzed soot gasification reactions. The soot gasification reaction products and the remaining reformate pass to the LNT 11, where they reduce NOx stored in the LNT 11. Some of this NOx is reduced to $NH_3$, most of which is captured by the ammonia-SCR catalyst 15 and used to reduce NOx during a subsequent lean phase. The clean-up catalyst 14 oxidizes unused reductants and unadsorbed $NH_3$ using stored oxygen or residual oxygen remaining in the exhaust during the rich phases.

From time-to-time, the LNT 11 must also be regenerated to remove accumulated sulfur compounds (desulfated). Desulfation involves heating the reformer 12 to an operational temperature, heating the LNT 11 to a desulfating temperature, and providing the heated LNT 11 with a reducing atmosphere. Desulfating temperatures vary, but are typically in the range from about 500 to about 850° C., with optimal temperatures typically in the range from about 650 to about 800° C. Below a minimum temperature, desulfation is very slow. Above a maximum temperature, the LNT 11 may be damaged.

The LNT 11 may be heated by injecting fuel at a rate that leaves the exhaust lean and maintains the reformer 12 at a high temperature, whereby heat convection from the reformer 12 heats the downstream DPF 10 and the LNT 11. If desired, the LNT can be heated to above the temperature of the DPF 10 and the reformer 12 by pulsing the fuel injection so that the exhaust is alternately lean and rich. Reductant adsorbed by the LNT 11 during the rich phases can react with oxygen provided by the lean phases to produce heat within the LNT 11. Alternatively, oxygen adsorbed by the LNT 11 during the lean phases can react with reductant provided during the rich phases. The LNT 11 can also be heated above the temperatures of the reformer 12 and the DPF 10 by injecting fuel into an exhaust line between the DPF 10 and the LNT 11.

Soot gasification can occur during either regenerations to remove NOx from the LNT 11 or regenerations to remove SOx from the LNT 11. Which type of regeneration accounts for the bulk of soot gasification depends in part on the soot gasification catalyst. In one embodiment, the catalyst is operative at typical diesel exhaust temperatures and the bulk of soot gasification takes place during denitrations. Removing soot during denitrations has the advantage that denitrations are very frequent.

In another embodiment, the catalyst is operative primarily at higher temperatures such as those to which the DPF 10 is heated during desulfation. High temperatures make soot gasification reactions easier to catalyze. Removing much of the soot from the DPF 10 by gasification under rich conditions during a desulfation of the LNT 11 has the advantage that there is less soot remaining to combust and overheat the DPF 10 under the lean conditions that typically follow LNT desulfation.

Soot gasification reactions include:

$$C+2H_2 \rightarrow CH_4 \quad (4)$$

$$C+H_2O \rightarrow CO+H_2 \quad (5)$$

$$C+CO_2 \rightarrow 2CO \quad (6)$$

Reaction (4) is hydrogen-methanation and is slightly exothermic. Reaction (5) is steam gasification and is endothermic. Reaction (6) is the reverse-Boudouard reaction, and is also endothermic. Reactions (5) and (6) can occur during both lean (with limited oxygen) and rich phases. If rich phases with substantial amounts of hydrogen are provided periodically, however, Reaction (4) will typically account for the bulk of the soot gasification. Hydrogen is very reactive and has an exceptionally high diffusivity.

A principal advantage of removing soot by soot gasification is that high temperatures associated with periodic soot combustion are avoided. Soot combustion typically involves a combustion front with local hot spots. High temperatures occurring at these hot spots can damage the DPF. If high temperatures can be avoided throughout the DPF operating cycle, a less expensive substrate, such as a cordierite substrate, can be used instead of a SiC substrate, which is typically used for its ability to endure high temperatures.

When hydrogen is provided to the DPF in conjunction with LNT regeneration, hydrogen does not need to be produced with high efficiency vis-à-vis carbon monoxide or be utilized with high efficiency by the DPF. Carbon monoxide and unused hydrogen are reductants needed by the LNT. Thus, while soot gasification using syn gas is possible independent of LNT regeneration, the efficiency of this process is greatly enhanced when the process is made an adjunct to LNT regeneration.

When soot gasification takes place during denitration, another advantage is that soot is removed more frequently, which reduces the amount of aging the soot undergoes before being treated. Soot becomes harder to remove after aging. When DPF regenerations are carried out more frequently, the DPF regenerations are more efficient and the life of the DPF may ultimately be extended. Preferably, the mass-averaged soot particle lifetime in the DPF 10 is about 15 minutes or less, more preferably about 10 minutes or less, still more preferably about 5 minutes or less. These averages are measured excluding any deposits, such as ash, that may be considered permanent in that they are not removable by routine DPF regenerations, such as soot gasification and soot combustion.

Any suitable catalyst can be used to catalyze the soot gasification reactions. Examples of suitable catalysts include precious metals. Alkali metals are also known to be soot gasification catalysts; however, they are generally ineffective except at higher temperatures. A preferred catalyst, such as a precious metal, is operable at typical diesel engine exhaust temperatures, e.g., about 400° C. Stability is also an important feature provided by precious metal catalysts to a greater degree than alkali metal catalysts.

Catalysts such as $CeO_2$ that have substantial oxygen storage capacity are preferably avoided. Stored oxygen can result in combustion of reductant; undesirably increasing the fuel penalty for LNT regeneration and producing unwanted heat in the DPF 10. Preferably, at least about 80% of the syn gas provided to the DPF 10 over the course of a LNT regeneration is used to gasify soot or passed to the downstream LNT 11, more preferably at least about 90%, mot preferably at least about 95%.

The DPF 10 is preferably of a type that provides a high degree of intimate contact between trapped soot and the catalyst coating. Generally, this means the DPF 10 uses depth filtration, but does not use cake filtration. Cake filtration is the primary filter mechanism in a wall flow filter. In a wall flow filter, the soot-containing exhaust is forced to pass through a porous medium. Typical pore diameters are from about 0.1 to about 25 μm. Soot particles are most commonly from about 10 to about 500 nm in diameter. In a fresh wall flow filter, the initial removal is by depth filtration, with soot becoming trapped within the porous structure. Quickly, however, the soot forms a continuous layer on an outer surface of the porous structure. Subsequent filtration is through the filter cake and the filter cake itself determines the filtration efficiency. As a result, the filtration efficiency increases over time. The filter cake is generally allowed to build to a thickness from about 15 to 50 μm deep before regeneration. Thus, although some depth filtration occurs in a wall flow filter, the primary mechanism is cake filtration and only a small fraction of the soot is in intimate contact with the DPF and any catalyst coating.

In a flow through filter on the other hand, the primary mechanism of soot trapping is depth filtration and there is a relatively intimate contact between the soot and the catalyst coating. In a flow through filter, the exhaust is channeled through macroscopic passages. The passages may have rough walls, baffles, and bends designed to increase the tendency of momentum to drive soot particles against or into the walls, but the flow is not forced though micro-pores. The resulting soot removal is considered depth filtration, although the soot is generally not distributed uniformly with the depth of any structure of the filter. Because the soot does not form such thick layers as in cake filtration, there is more intimate contacting between the soot and the DPF catalyst coating. In depth filtration, soot layers are less than 10 μm deep, typically less than 1 μm deep.

Soot gasification can be used in conjunction with other soot removal methods. Other soot removal methods include continuous and intermittent combustion. Continuous combustion generally requires $NO_2$ in the exhaust and a suitable catalyst in the DPF 10. $NO_2$ is normally present in the exhaust, but in order to make continuous combustion more effective, the $NO_2$ concentration is preferably increased by providing a catalyst for oxidizing a portion of the NO in the exhaust to $NO_2$.

Continuous combustion generally requires a large amount of oxidation catalyst for converting NO to $NO_2$, but if continuous combustion is not the only mechanism relied on a smaller oxidation catalyst can be used. Preferably, this catalyst is located near the engine and can serve other purposes.

Figure 2:
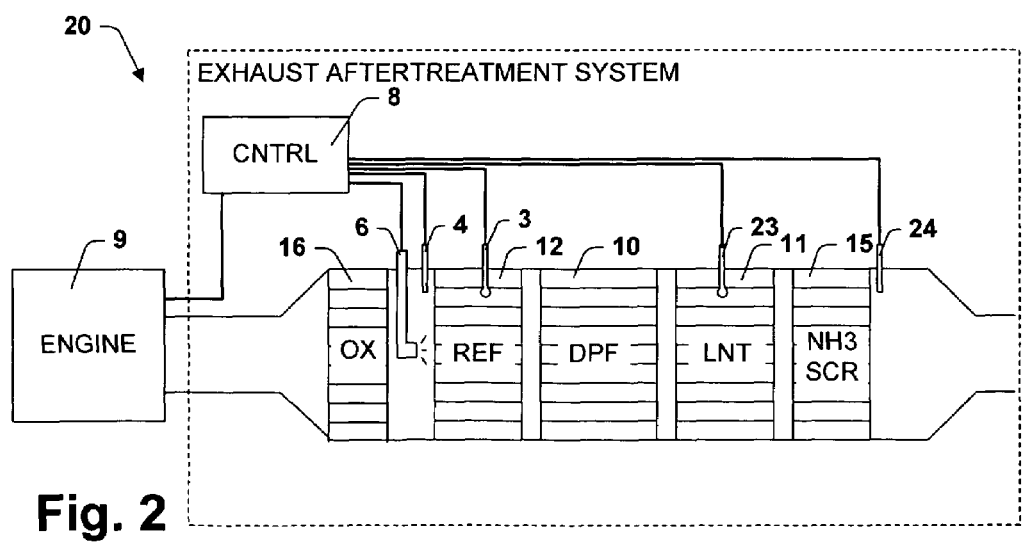
FIG. 2 is a schematic illustration of another exemplary power generation system conceived by the inventor.

FIG. 2 provides a schematic illustration of an exemplary power generation system 20 configured for continuous soot combustion. The power generation system 20 has many of the same components as the power generation system 5. In addition, the power generation system 20 has an oxidation catalyst 16 configured upstream of the fuel injector 6 which is itself upstream of the reformer 12. In the power generation system 10, the DPF 10 preferably includes in its catalyst coating a catalyst for the combustion of soot with $NO_2$.

Besides converting NO to $NO_2$ under lean exhaust conditions, the oxidation catalyst 16 can operate to heat the exhaust slightly by combusting residual hydrocarbons in the exhaust. This additional heat can extend the operating temperature range of the LNT 11 and the reformer 12, allowing the reformer 12 to be started at lower exhaust temperatures and allowing the LNT 11 to be effective at lower temperatures. The additional heat can also maintain the DPF 10 at higher temperatures and thereby increase the rates of soot gasification and combustion reactions.

Another potential purpose of the oxidation catalyst 16 is to remove a portion of the oxygen from the exhaust, which facilitates stable operation of the reformer 12. When exhaust oxygen concentrations are high, the reformer 12 may tend to overheat during regeneration of the LNT 11. To prevent overheating, it may be necessary to periodically shut the reformer 12 down and allow it to cool. These interruptions increase the fuel penalty for regenerating the LNT 11. Consuming some of the oxygen upstream of the reformer 12 reduces the likelihood that such shutdowns will be required. Heat produced by consuming oxygen upstream of the reformer 12 may eventually transfer to the LNT 11, but the transfer is delayed due to the thermal mass of the upstream devices, some of the heat is lost to the surroundings, and the heat that does arrive is distributed more uniformly and is thus less problematic. To increase the amount of oxygen removal by the oxidation catalyst 16 during operation of the reformer 12, the engine 9 can be operated to produce a greater than normal amount of hydrocarbon, possibly even exceeding its smoke limit.

Intermittent combustion involves heating the DPF 11 to temperatures at which trapped soot combusts with oxygen in the exhaust. This combustion is exothermic and typically becomes self-sustaining. A catalyst can be used to reduce the temperature at which this combustion occurs. Generally, it is desirable that soot gasification reduce the need for this type of combustion, or eliminate it altogether. The primary disadvantage of this type of regeneration is its tendency to degrade the DPF 11. If soot gasification simply reduces the amount of soot that must be intermittently combusted in the DPF 11 and thus reduces the frequency with which the DPF 11 must be heated or the temperatures it reaches during combustion, then soot gasification is still beneficial. The DPF 11 can be heated by providing reductant to the exhaust upstream of the reformer 12 at a rate that leaves the exhaust lean, whereby heat is produced in the reformer 12, which eventually heats the DPF 11. Intermittent soot combustion can be combined with LNT desulfation so that the components need not be heated twice.

The time at which to regenerate the LNT 11 to remove accumulated NOx can be determined by any suitable method. Examples of methods of determining when to begin a regeneration include initiating a regeneration upon reaching a thresholds in any of a NOx concentration in the exhaust, a total amount of NOx emissions per mile or brake horsepower-hour over a previous period or since the last regeneration, a total amount of engine out NOx since the last regeneration, an estimate of NOx loading in the LNT 11, and an estimate of adsorption capacity left in the LNT 11. Regeneration can be periodic or determined by feed forward or feedback control. Regeneration can also be opportunistic, being triggered by engine operating conditions that favor low fuel penalty regeneration. A threshold for regeneration can be varied to give a trade off between urgency of the need to regenerate and favorability of the current conditions for regeneration. The time at which to regenerate the LNT 11 can be determined by the controller 8, which generates a control signal that initiates the regeneration process.

Desulfation may be scheduled periodically, e.g., after every 30 hours of operation. Alternatively, desulfation may be scheduled based on an estimate of the amount on SOx stored in the LNT 11. The amount of stored SOx can be assumed to increase in proportion to fuel usage and to decrease in a manner dependent on the extent of desulfations. A further option is to determine the need for desulfation based on system performance, e.g., based on the activity of the LNT 11 following an extensive denitration or based on the frequency with which denitration is required.

The reformer 12 converts injected fuel into more reactive reformate. A reformer that operates at diesel exhaust gas temperatures requires a large amount of catalyst and may excessively increase the cost of an exhaust aftertreatment system. Accordingly, the reformer 12 is preferably of the type that has low thermal mass and must be heated to be operational.

While the LNT 11 is regenerated effectively by both CO and $H_2$, $H_2$ is much preferred for soot gasification. Thus, although not required or most reformers used to regenerate LNTs, in one embodiment, the reformer 12 is augmented with a water-gas shift reaction catalyst for converting CO to $H_2$. The catalyst can be loaded in the reformer 12, the DPF 10, or in between. An advantage of locating this catalyst in the DPF 10 is that the reaction is driven by consumption of hydrogen.

Figure 3:
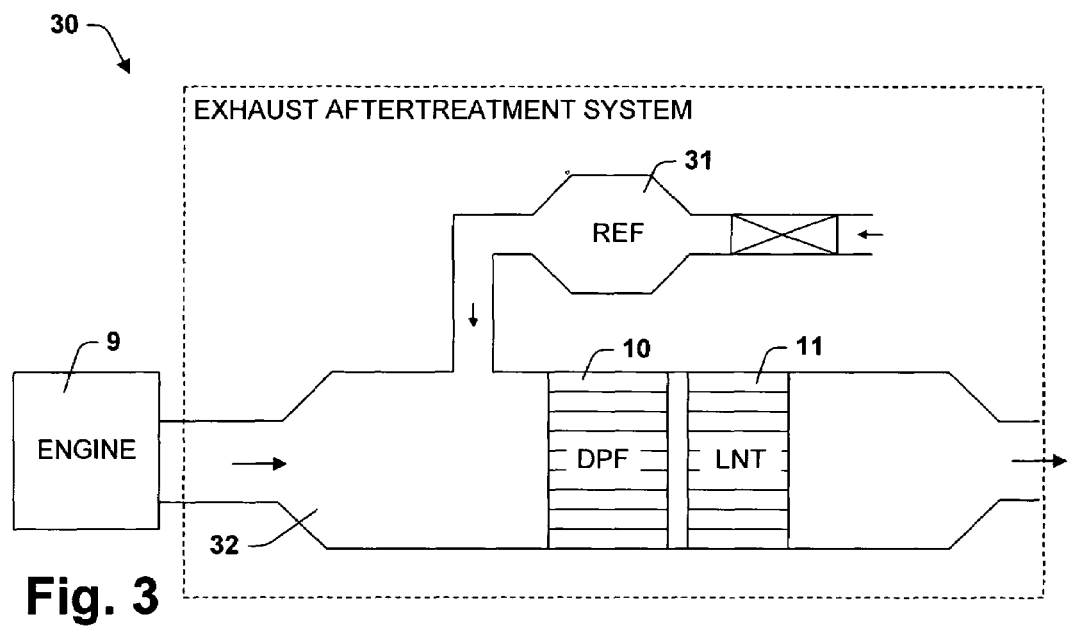
FIG. 3 is a schematic illustration of still another exemplary power generation system conceived by the inventor.

While in the examples given so far, a fuel reformer has been placed in an exhaust line upstream of the DPF 10, the reformer can be located outside the exhaust line. FIG. 3 provides an exemplary power generation system 30 in which a fuel reformer 31 is configured outside an exhaust line 32, but in position to provide syn gas to the exhaust in the exhaust line 32 upstream of the DPF 10 and the LNT 11. It may be desirable to place an oxidation catalyst in the exhaust line 32 to facilitate removal of oxygen from the exhaust by combustion with reformate. This catalyst can be before the DPF 10, part of the DPF 10, or between the DPF 10 and the LNT 11. The reformer 31 can be provided with a feed of fuel and air or fuel and exhaust, An offline reformer, like the reformer 31, can be more efficient in producing reformate from fuel than an inline reformer 12, however, the inline configuration has the advantage oxygen removal from the exhaust takes place during reformate production and less fuel is required to remove oxygen from the exhaust.

If it is difficult to achieve a target level of particulate emission control while maintaining a sufficiently small size of the DPF 10, one option is to install a second DPF downstream of the LNT 11. The second filter can be of the wall flow type and much large than the DPF 10. Preferably, however, the majority of the particulates are removed by the DPF 10. The second DPF can be heated for regeneration in conjunction with heating of the LNT 11 for desulfation.

While the engine 9 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The power generation system can have any suitable types of transmission. A transmission can be a conventional transmission such as a counter-shaft type mechanical transmission, but is preferably a CVT. A CVT can provide a much larger selection of operating points than a conventional transmission and generally also provides a broader range of torque multipliers. The range of available operating points can be used to control the exhaust conditions, such as the oxygen flow rate and the exhaust hydrocarbon content. A given power demand can be met by a range of torque multiplier-engine speed combinations. A point in this range that gives acceptable engine performance while best meeting a control objective, such as minimum oxygen flow rate, can be selected.

In general, a CVT will also avoid or minimize interruptions in power transmission during shifting. Examples of CVT systems include hydrostatic transmissions; rolling contact traction drives; overrunning clutch designs; electrics; multi-speed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects-the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer comprising a steam reforming catalyst. Examples of reformer catalysts include precious metals, such as Pt, Pd, Rh, or Ru, and oxides of Al, Mg, Si, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 450° C. The reformer is generally operative at temperatures from about 450 to about 1100° C.

The LNT 11 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The adsorbent is typically combined with a binder and applied as a coating over an inert substrate. Optionally, the LNT 11 can be combined with the DPF 10 by applying the adsorbent as a coating on the DPF 10. In one embodiment, the adsorbent is applied as a coating on the downstream passages of a wall flow DPF 10.

The LNT 11 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalyst 14 is a catalyst effective to catalyze reactions between NOx and $NH_3$ to reduce NOx to $N_2$ in lean exhaust. Examples of SCR catalysts include oxides of metals such as Cu, Fe, Zn, V, Cr, Al, Ti, Mn, Co, Fe, Ni, Pd, Pt, Rh, Rd, Mo, W, and Ce, zeolites, such as ZSM-5, ZSM-11, MOR, or FER substituted with metal ions such as cations of Cu, Fe Co, Ag, Zn, or Pt, and activated carbon. Preferably, the ammonia-SCR catalyst 14 is designed to tolerate temperatures required to desulfate the LNT 11.

The particulate filter 10 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers and wires. Typical pore sizes for the filter elements are about 25 μm or more.

The clean-up catalyst 14 is preferably functional to oxidize unburned hydrocarbons from the engine 9, unused reductants, and any $H_2S$ released from the NOx absorber-catalyst 11 and not oxidized by the ammonia-SCR catalyst 15. Any suitable oxidation catalyst can be used. To allow the clean-up catalyst to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
    operating a diesel engine to produce power and exhaust;
    passing the exhaust through a particulate filter to trap soot from the exhaust;
    passing the exhaust through a LNT, whereby the LNT adsorbs and stores $NO_x$ and $SO_x$ from the exhaust;
    from time-to-time initiating a rich phase in which a fuel reformer is used to produce reformate that is provided to the exhaust upstream of the DPF, whereby the DPF receives a rich exhaust mixture containing reformate;
    in the rich phase, catalyzing at temperatures of 400° C. or less soot gasification reactions selected from the group consisting of hydrogen-methanation, steam gasification, and the reverse-Boudouard reaction, by which soot is removed from the DPF and the DPF produces a rich DPF exhaust; and
    passing the rich DPF exhaust through the LNT, whereby the LNT is regenerated.

2. The method of claim 1, wherein at least about 50% of the trapped soot is removed by the soot gasification reactions.

3. The method of claim 1, wherein at least about 50% of the trapped soot is removed by the soot gasification reactions during LNT denitrations.

4. The method of claim 1, wherein at least about 50% of the trapped soot is removed by the soot gasification reactions during LNT desulfations.

5. The method of claim 1, wherein the fuel reformer is configured to receive the engine exhaust.

6. The method of claim 5, further comprising, immediately preceding the rich phase, a lean phase in which fuel is injected into the exhaust upstream of the reformer at a rate that leaves the exhaust lean, whereby the fuel reformer heats by combustion of the injected fuel.

7. The method of claim 1, wherein the DPF catalyzes soot gasification with a catalyst that consists essentially of materials other than alkali metals.

8. The method of claim 1, wherein the DPF catalyzes soot gasification with a catalyst that consists essentially of precious metal.

9. The method of claim 1, wherein the DPF removes the soot primarily by depth filtration.

* * * * *